US005384603A

United States Patent [19]
Strauss et al.

[11] Patent Number: 5,384,603
[45] Date of Patent: Jan. 24, 1995

[54] VIDEO SIGNAL SPLITTER WITH DC SHORT CIRCUIT PROTECTION

[75] Inventors: Philip R. Strauss, Fullerton; John B. Crosby, Yorba Linda, both of Calif.

[73] Assignee: Multiplex Technology, Inc., Brea, Calif.

[21] Appl. No.: 127,359

[22] Filed: Sep. 28, 1993

[51] Int. Cl.⁶ .................... H04N 5/63; H04N 7/10
[52] U.S. Cl. .................................. 348/730; 348/6
[58] Field of Search ............... 348/730, 705, 706, 6; 358/86; H04N 7/10, 5/63; 455/3.3

[56] References Cited

U.S. PATENT DOCUMENTS

| | | | |
|---|---|---|---|
| 3,660,719 | 5/1972 | Grenier | 317/16 |
| 4,161,008 | 7/1979 | Zimmermann et al. | 361/56 |
| 4,219,861 | 8/1980 | Wiegand | 361/106 |
| 4,262,317 | 4/1981 | Baumbach | 361/124 |
| 4,408,248 | 10/1983 | Bulley et al. | 361/91 |
| 4,440,980 | 4/1984 | Bakker | 179/81 R |
| 4,556,856 | 12/1985 | Presser | 333/124 |
| 4,586,104 | 4/1986 | Standler | 361/91 |
| 4,647,868 | 3/1987 | Mueller | 330/286 |
| 4,845,580 | 7/1989 | Kitchens | 361/91 |
| 5,077,630 | 12/1991 | Bina | 361/119 |

Primary Examiner—James J. Groody
Assistant Examiner—John W. Miller
Attorney, Agent, or Firm—Lynn & Lynn

[57] ABSTRACT

A system for supplying control signals, DC power and video signals to a plurality of video system components includes a DC signal splitter and an RF signal splitter. The RF signal splitter carries video signal to a multiplicity of components. The DC signal splitter carries DC power and low frequency control signals to the multiplicity of components. Each of the signal paths for the DC power and the control signals includes DC short circuit protection, which prevents the occurrence of a short circuit in one output from causing the entire system to fail.

4 Claims, 2 Drawing Sheets

VIDEO SIGNAL SPLITTER WITH DC SHORT CIRCUIT PROTECTION

BACKGROUND OF THE INVENTION

This invention relates generally to signal splitters that carry RF signals, DC power and low frequency AC control signals. This invention relates particularly to a signal splitter for connection to a coaxial cable that carries modulated video signals, DC power and low frequency control signals. Still more particularly, this invention relates to apparatus and methods for providing DC short circuit protection in a signal splitter for connection to a coaxial cable that carries RF video signals, DC power and low frequency control signals.

Many homes and businesses have video signal distribution systems for distributing video signals to two or more devices such as television receivers and video cassette recorders. The source of the video signal is typically an antenna or cable television (CATV) system. The video signals are typically distributed between various video devices via coaxial cables.

In a typical home where CATV is the video signal source, a decoder box is connected directly to the CATV outlet, and other devices receive video signals directly or indirectly from the decoder box. Signal splitters are typically used to interconnect the components of a video system. Television sets and video cassette recorders may often be operated by remote control systems for functions such as channel selection and volume control. Such control systems typically use infrared signals to transmit control signals between a hand-held transmitter and a receiver included in the video device. Ordinarily a direct line of sight is required between the transmitter and the receiver.

It is possible to use the coaxial cables that carry the video signals for carrying control signals and DC power. This permits a viewer in a location not having a direct line of sight between the receiver and the hand-held transmitter to have control of a decoder box, a VCR or a television set. The transmitter sends infrared (IR) control signals to an auxiliary receiver having a direct line of sight to the transmitter. The auxiliary receiver is connected to the coaxial video distribution cables and converts the IR control signals into electrical signals that are carried on the coaxial cables to a signal converter. The signal converter that converts the electrical signals back into IR control signals that are retransmitted via IR to the video device whose operation is to be controlled.

In modern video distribution systems it is possible to supply power to the signal converter by means of the coaxial cable. The signal converter may typically require 12 volts DC for its operation. Therefore, the coaxial cables carry video signals, control signals and DC power. A video system may include several components that draw DC power from the coaxial cable.

When all the components of a video system are properly connected, there is ordinarily no problem with using the coaxial cables to carry DC power and more than one type of AC signal. However, it is possible for components to be improperly connected during installation so that a DC short circuit exists. In present video systems a short circuit on one outlet of a signal splitter stops operation of the entire system and may damage the DC power supply. Determining the cause of the malfunction or locating an improperly connected device is similar to the problem of determining which light bulb is faulty in a series string of Christmas tree lights.

SUMMARY OF THE INVENTION

The present invention provides short circuit protection in a signal splitter that carries video signals, control signals and DC power to a multiplicity of components in a video system. The present invention thus prevents the occurrence of a short circuit in one output from causing the entire system to fail. If a short circuit should occur in one component, it is a simple matter to identify which component is inoperable.

A system according to the present invention for supplying DC power, control signals and video signals to a plurality of video system components comprises a coaxial cable that guides the video signals, the control signals and the DC power. The invention includes means for separating the control signals and the DC power from the video signals so that the control signals and the DC power follow a plurality of paths separate from the video signals. Each DC path includes means for limiting the electrical current that may be conducted to provide low frequency short circuit protection in the plurality of paths.

The means for limiting the electrical current may comprise a thermistor connected in series in each of the paths that carry the control signals and the DC power. The means for limiting the electrical current may comprise a transistor circuit in each path designed to limit the current to a predetermined value.

The transistor circuit in each path may comprise a sensing transistor, a sensing resistor and a series pass transistor. If there is no short circuit at the output of the series pass transistor, the DC power and the control signals pass through the sensing resistor into the emitter of the series pass transistor and out of the collector of the series pass transistor. The sensing resistor is connected across the base-emitter junction of the sensing transistor. The collector of the sensing transistor provides the base drive to the series pass transistor to control whether the series pass transistor is in a conducting or non-conducting state. When the electrical current through the sensing resistor exceeds a predetermined value, then the base drive of series pass transistor is reduced to prevent excessive current flow out of the collector of the series pass transistor.

The system according to the present invention may further include a capacitor connected across the emitter-base junction of the sensing resistor to provide a resistance-capacitance circuit having an RC delay that prevents shut down of the system in the presence of transient overloads having a duration less than a predetermined time.

DESCRIPTION OF THE PREFERRED EMBODIMENT

The invention is described with reference to a four-way signal splitter merely for purposes of illustrating the structure and advantages of the invention. The invention is not in any way limited to a four-way signal splitter. The invention may be included in a signal splitter that splits an input electrical signal into any number of electrical signal outputs.

Figure 1:
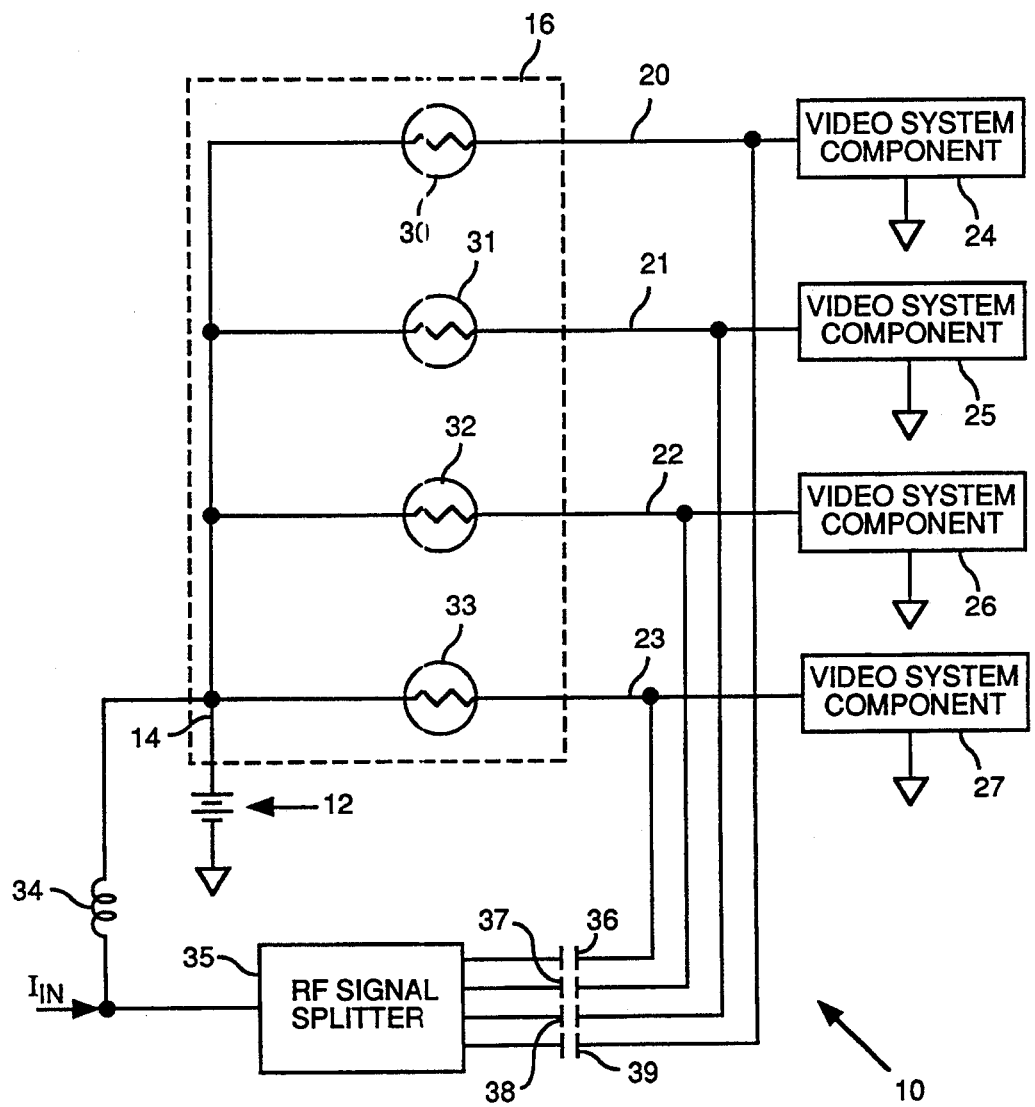
FIG. 1 schematically illustrates a four-way signal splitter having a positive temperature coefficient thermistor in each output for providing short circuit protection.

Referring to FIG. 1, a video signal distribution system 10 includes a power supply 12 connected to supply DC electrical power to a coaxial cable 14. The coaxial cable 14 is connected to the input port of a four-way signal splitter 16. The signal splitter 16 divides electrical signals input thereto and provides electrical signal outputs to coaxial cables 20–23. The coaxial cables 20–23 are connected to provide signals to video system components 24–27.

Figure 3:
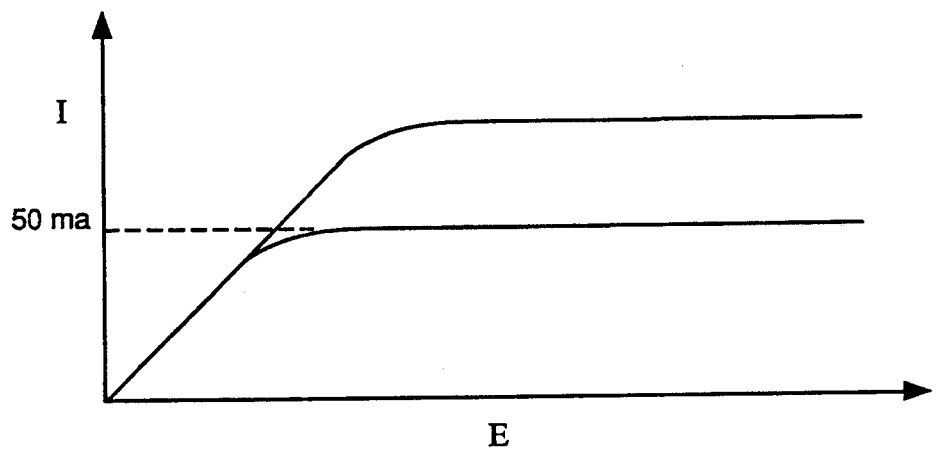
FIG. 3 illustrates the current-voltage characteristics of the circuits of FIGS. 1 and 2.

Thermistors 30–33 are connected between the input and the four outputs, respectively of the signal splitter 16. The thermistor 30, for example, provides DC short circuit protection if the video system component 24 should for any reason become a DC short circuit. The upper curve of FIG. 3 illustrates current-voltage characteristics of a typical positive temperature coefficient thermistor. For a range of voltages, the ratio of the current to voltage is a constant, which for a typical thermistor may be about one ohm. After the voltage reaches a predetermined value, the current remains constant.

The knee in the thermistor current-voltage curve represents a current that is less than what a 75 $\Omega$ load would draw without causing damage to the device connected to the output terminal. In the video signal splitter according to the present invention the constant current output of the thermistor is set to a value that does not damage components connected to the thermistor. Because each leg of the signal splitter has its own thermistor, a short circuit in one leg cannot cause other legs to cease proper operation.

The current $I_{IN}$ that is shown being input to the video signal distribution system 10 includes the RF video signals, low frequency control signals and the DC power. A suitable inductor 34 connected to the splitter 16 prevents the RF video signals from passing through the thermistors 30–33. The thermistors 30–33 have no effect on the transmission of the RF video signals to the video system components 24–27. An RF signal splitter 35 divides the RF video signals and directs them to each of the video system components 24–27. DC blocking capacitors 36–39 connected to the outputs of the RF signal splitter 35 prevent low frequency signals from following the same path as the RF video signals to the video system components 24–27.

Therefore, it may be seen that the RF video signals are separated from the DC power and the low frequency control signals. The low frequency short circuit protection has no effect on the transmission of the RF video signals to the video system components 24–27. However, if any of the video system components includes a DC short circuit, the thermistors 30–33 prevent the DC power and the low frequency control signals from exceeding predetermined values.

Figure 2:
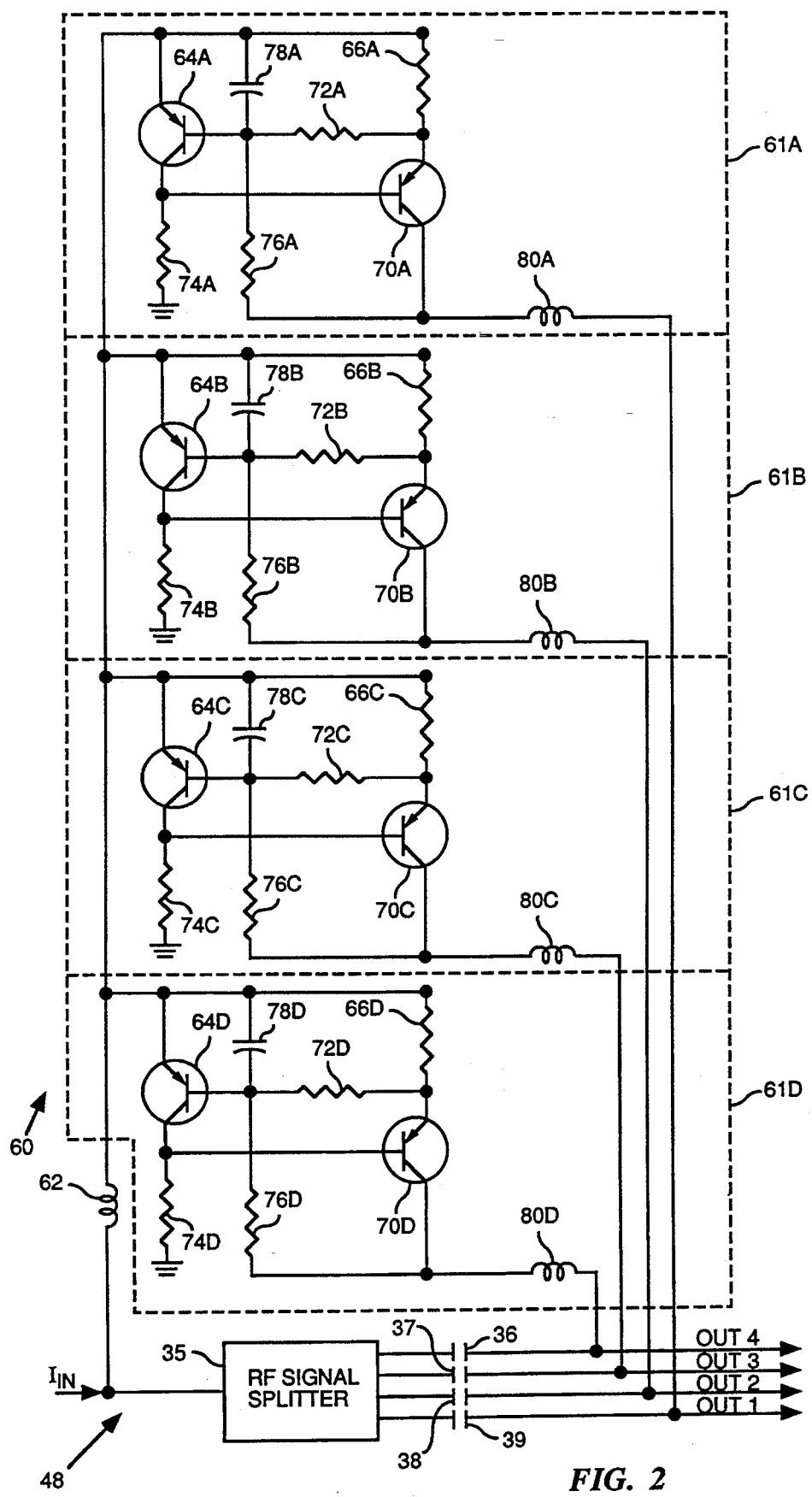
FIG. 2 schematically illustrates a four-way signal splitter having a transistor circuit in each output leg for providing short circuit protection.

The invention also may be embodied in a transistor circuit that is essentially the equivalent of a thermistor. Referring to FIG. 2, a four way video signal splitter 48 includes a transistor circuit in each of its four legs. The signal splitter 48 may include the RF signal splitter 35 connected to the blocking capacitors 36–39 of FIG. 1.

A signal input $I_{IN}$ that includes RF video signals, low frequency control signals and DC power is input to the four way video signal splitter 48. The RF components of the signal $I_{IN}$ are directed to the RF signal splitter 35. The low frequency control signals and the DC component of the signal $I_{IN}$ are directed to a low frequency signal splitter 60 having legs 60A, 60B, etc.

The DC signal splitter 60 includes four legs 61A, 61B, 61C and 61D, which may be essentially identical in structure. Therefore, only the structure and method of operation of the leg 61A is described in detail. The legs 61A–61D are arranged to provide control signals and DC power to terminals indicated by the labels OUT 1–OUT 4, respectively in FIG. 2. The components of the leg 61A are referenced by a numeral followed by the letter "A." Components of the legs 61B, 61C and 61D are referenced by the same numeral is in the leg 61A followed by the letters "B," "C," and "D" as appropriate. The DC component of the signal $I_{IN}$ first passes through an inductor 62 that functions as an RF choke to prevent the RF portion of the signal $I_{IN}$ from being affected by the DC signal splitter 60.

The control signals and the DC power are applied to the emitter of a sensing transistor 64A and to a sensing resistor 66A that has one terminal connected to the emitter of the sensing transistor 64A. The sensing transistor 64A may be a 2N2907, and the sensing resistor 66A may have a resistance of approximately 5.1 $\Omega$. The other terminal of the sensing resistor 66A is connected to the emitter of a series pass transistor 70A, which may also be a 2N2907.

The sensing resistor 66A and the emitter of the series pass transistor 70A are connected to a resistor 72A, which is connected to the base of the sensing transistor 64A. The resistor 72A may have a resistance of about 100 $\Omega$.

The collector of the sensing transistor 64A is connected to a first terminal of a resistor 74A. The second terminal of the resistor 74A is grounded. The resistor 74A may have a resistance of about 5.1 K$\Omega$.

A resistor 76A has a terminal connected between the base of the sensing transistor 64A and the collector of the series pass transistor 70A. The resistor 76A may have a resistance of about 2 K$\Omega$. The base of the transistor 70A is connected to the collector of the sensing transistor 64A. The other terminal of the resistor 76A is connected to the collector of the series pass transistor.

A capacitor 78A has its terminals connected between the emitter and base of the sensing transistor 64A. From the circuit diagram of FIG. 2, it may be seen that the capacitor 78A is also connected between the emitter of the sensing resistor 66A and the resistors 72A and 76A. The capacitor 78A may have a capacitance of about 100 $\mu$F. The capacitance of the capacitor 78A is preferably sufficiently large that transients will be smoothed and squashed. When a 75 $\Omega$ load is connected to the corresponding output of the signal splitter 48, the capacitor 78A begins to charge, and the leg 61A begins to cut off.

The lower current-voltage curve of FIG. 3 illustrates the characteristics of the legs of the signal splitter 60. The resistors in the legs 61A–61D preferably are adjusted so that the current throughput of each leg is limited to about 50 ma and then reduced to about 20 ma when the capacitor 78A is fully charged.

The resistors 72A and 76A provide current feedback to the transistor 64A. These resistors 72A and 76A act to sense the voltage across the transistor 70A to maintain an essentially constant voltage across its emitter-collector junction. The resistor 74A is a DC biasing resistor that turns on the transistor 70A. The transistor 64A works against the resistor 74A to shut off the transistor 70 if a short circuit should occur in the video system component connected thereto. The voltage divided effect of the resistors 72A and 76A causes the transistor 64A to reduce the base drive current to the transistor 70 as the voltage across the transistor 70 increases.

An inductor 80A has one terminal connected to the resistor 76A and the collector of the series pass transistor 70A. The inductor 80A may have an inductance of about 3.3 µH, which allows the inductor 80A to act essentially as a low frequency short circuit. The other terminal of the inductor 80A is connected to an output terminal of the signal splitter 48. The output of the leg 61A of the signal splitter 60 must therefore pass through the inductor 80A.

The series pass transistor 70A normally is saturated so that current input to the sensing transistor 66 flows through the sensing resistor 66A to the emitter of the series pass transistor 70A. The current then flows out of the collector of the series pass transistor 70A, through the inductance 80A to the load that is connected to the terminal OUT 1 of the signal splitter 48. If the load should become a short circuit and draw a current greater than a predetermined value, then the voltage across the sensing resistor 66 rises to a value sufficient to cause conduction between the emitter and collector of the sensing transistor 64A. As the sensing transistor 64A becomes conductive, it removes the base drive from the series pass transistor 70A. The series pass transistor 70A therefore shuts off when the sensing transistor 64A becomes sufficiently conductive and no current is delivered to the terminal OUT 1.

The structures and methods disclosed herein illustrate the principles of the present invention. The invention may be embodied in other specific forms without departing from its spirit or essential characteristics. The described embodiments are to be considered in all respects as exemplary and illustrative rather than restrictive. Therefore, the appended claims rather than the foregoing description define the scope of the invention. All modifications to the embodiments described herein that come within the meaning and range of equivalence of the claims are embraced within the scope of the invention.

What is claimed is:

1. A system for supplying DC power, low frequency control signals and RF video signals to a plurality of video system components, comprising:
    means for guiding the DC power, low frequency control signals and RF video signals;
    means for separating the DC power and the control signals from the RF video signals;
    means for routing the DC power and the control signals to each of the video system components along a plurality of control signal paths separate from the video signals; and
    current limiting means for limiting the amount of electrical current that may be conducted by each of the plurality of control signal paths to provide low frequency short circuit protection in the plurality of control signal paths.

2. The system of claim 1 wherein the current limiting means comprises a thermistor connected in series in each of the control signal paths.

3. The system of claim 1 wherein each of the control signal paths includes:
    a sensing transistor having its emitter arranged to receive an electrical current input;
    a sensing resistor having an input terminal connected to the emitter of the sensing transistor;
    a series pass transistor having its emitter connected to an output terminal of the sensing resistor;
    means for connecting the emitter of the series pass transistor and the base of the sensing transistor; and
    means for connecting the collector of the sensing transistor to the base of the series pass transistor such that the base drive of the series pass transistor is supplied by the collector of the sensing transistor, the sensing transistor and the series pass transistor being arranged such that when the electrical current through the sensing resistor exceeds a predetermined value, then the base drive of series pass transistor is reduced to control the current flow out of the collector of the series pass transistor.

4. The system of claim 3 further including a capacitor connected between the emitter and base of the sensing transistor to provide an RC delay that prevents shut down of the system in the presence of a low frequency overloads having a duration less than a predetermined time.

* * * * *